United States Patent [19]
Buelt et al.

[11] Patent Number: 5,100,259
[45] Date of Patent: Mar. 31, 1992

[54] COLD CAP SUBSIDENCE FOR IN SITU VITRIFICATION AND ELECTRODES THEREFOR

[75] Inventors: James L. Buelt; John G. Carter; Eugene A. Eschbach; Vincent F. FitzPatrick; Paul L. Koehmstedt; William C. Morgan; Kenton H. Oma; Craig L. Timmerman, all of Richland, Wash.

[73] Assignee: Battelle Memorial Institute, Richland, Wash.

[21] Appl. No.: 518,461

[22] Filed: May 2, 1990

Related U.S. Application Data

[60] Division of Ser. No. 255,057, Oct. 7, 1988, Pat. No. 4,956,535, which is a continuation-in-part of Ser. No. 60,253, Jun. 8, 1987, abandoned.

[51] Int. Cl.$^5$ .................................................. E02D 3/00
[52] U.S. Cl. ..................................... 405/128; 405/131; 405/258; 166/248; 219/10.81
[58] Field of Search ................ 405/128, 129, 258, 131, 405/303; 219/10.81, 10.41; 175/16; 166/248

[56] References Cited

U.S. PATENT DOCUMENTS

| | | | |
|---|---|---|---|
| 2,821,611 | 1/1958 | Mann et al. | 219/10.81 X |
| 4,084,638 | 4/1978 | Whiting | 166/248 |
| 4,376,598 | 3/1983 | Brouns et al. | 405/258 |
| 4,590,348 | 5/1986 | Lahti et al. | 405/131 X |

*Primary Examiner*—Dennis L. Taylor
*Attorney, Agent, or Firm*—Dellett, Smith-Hill and Bedell

[57] ABSTRACT

An electrode for use in in situ vitrification of soil comprises a molybdenum rod received within a conductive sleeve or collar formed of graphite. Electrodes of this type are placed on either side of a region containing buried waste material and an electric current is passed therebetween for vitrifying the soil between the electrodes. The graphite collar enhances the thermal conductivity of the electrode, bringing heat to the surface, and preventing the formation of a cold cap of material above the ground surface. The annulus between the molybdenum rod electrode and the graphite collar is filled with a conductive ceramic powder of a type that sinters upon the molybdenum rod, protecting the same from oxidation as the graphite material is consumed, or a metal powder which liquifies at operating temperatures. The molybdenum rod in the former case may be coated with an oxidation protectant, e.g. of molybdenum disilicide. As insulative blanket is suitably placed on the surface of the soil during processing to promote subsidence by allowing off-gassing and reducing surface heat loss.

In other embodiments, connection to vitrification electrodes is provided below ground level to avoid loss of connection due to electrodes deterioration, or a sacrificial electrode may be employed when operation is started. Outboard electrodes can be utilized to square up the vitrified area.

Further, the center of the molybdenum rod can be made hollow and filled with a powdered metal, such as copper, which liquifies at operating temperatures. In one embodiment, the molybdenum rod and the graphite collar are physically joined at the bottom.

29 Claims, 10 Drawing Sheets

COLD CAP SUBSIDENCE FOR IN SITU VITRIFICATION AND ELECTRODES THEREFOR

This invention was made with Government support under Contract DE-AC06-76RLO 1830 awarded by the U.S. Department of Energy. The Government has certain rights in the invention.

This is a divisional of copending application Ser. No. 07/255,057, filed on 10/07/88, now U.S. Pat. No. 4,956,535, which was a continuation-in-part of Ser. No. 07/060,253, filed on 06/08/87 and now abandoned.

BACKGROUND OF THE INVENTION

The present invention relates to a method and apparatus for accomplishing in situ vitrification of soil and particularly to such a method and apparatus as promotes cold cap subsidence.

The presence of waste or contaminated material buried in the ground is a subject of concern relative to dispersion of the waste and contamination of the surrounding environment. Various methods have been employed for stabilizing or solidifying waste sites, for example the injection of soil reactant chemicals or solidifying compositions of material such as concrete. Stabilization has also been accomplished by artificially freezing the soil.

A particularly attractive method for solidifying or destroying hazardous waste material in situ and for general soil stabilization is described and claimed in Brouns et al. U.S. Pat. No. 4,376,598 entitled "In Situ Vitrification of Soil", issued Mar. 15, 1983. According to this method, two or more electrodes are placed in the ground and after a start-up procedure a substantial current is passed therebetween resulting in liquification or melting of the soil. The waste materials will be melted, pyrolized or dissolved in the molten soil. A gas collection apparatus is placed over the site for removing gaseous products of combustion. After melting, the current flow is discontinued whereupon the theretofore liquified mass hardens into vitrified material comprising for the most part a glass, a glass ceramic or a partially devitrified glass, having crystals and glass dispersed in a solid matrix. Any metals within the mass may be dissolved in the glass especially as oxides, or may form solids at its lower boundaries.

According to this procedure, the soil undergoing treatment reduces somewhat in bulk and "subsides" leaving a depressed area or pocket which is then backfilled to the original ground surface, further burying the solidified waste material. This mode of operation is achieved, for example, when employing electrodes exhibiting high electrical and heat conductivity such as graphite electrodes. Unfortunately, graphite electrodes are also short lived since they oxidize readily above the level of the molten surface. A graphite electrode life in excess of forty hours has not been demonstrated under these conditions. Graphite electrode failure occurs from oxidation at the molten soil surface at temperatures in excess of 600° C. Electrodes formed of molybdenum have heretofore been preferred.

Unfortunately, molybdenum electrodes of practical size do not appear to promote subsidence of the soil surface as hereinabove described, but rather tend toward causing the formation of a "cold cap", i.e., bringing porous vitrified soil to the surface and even above the original soil surface. This cold cap can create a disposal problem and/or require extensive backfill. Moreover, the porous cold cap may be a subject of concern regarding possible future compaction of the porous vitrified material.

In any case, electrode life in the above processes is shorter than desired because of the high operating temperatures and high electrode oxidation rates encountered. Replacement of electrodes during processing after failure can represent a major expenditure in waste control by vitrification.

SUMMARY OF THE INVENTION

In accordance with the present invention in a particular embodiment thereof, a primary electrode utilized in the in situ vitrification process is placed inside an electrically conductive sleeve electrode member, at least along the length of the primary electrode between the soil surface and an underlying location at the eventual subsidence level. The conductive sleeve member is formed of a material and has a diameter for providing a higher degree of thermal conduction than exhibited by the primary electrode. Although the conductive sleeve may be more readily consumed in the soil-melting procedure, it will nevertheless remain intact up to the top surface level of the molten mass for promoting subsidence.

According to an embodiment of the present invention, the annulus between the primary electrode and the surrounding sleeve is filled with a comminuted ceramic or metallic material which is conductive and becomes sintered onto the primary electrode as the sleeve is consumed. In accordance with a preferred embodiment, the annulus contains liquid conductive metal at operating temperatures. Below the high temperature region adjacent to the melted soil, the same metal suitably forms a solid plug in the annulus.

According to a further embodiment of the present invention, the primary electrode is formed of molybdenum, the protective sleeve is formed of graphite, and comminuted material therebetween is a metal as mentioned, or a conductive ceramic comprising zirconium diboride and molybdenum disilicide. The ceramic material is selected according to its oxidation resistance and electrical conductivity properties, and sinters onto the molybdenum primary electrode forming a protective coating for resisting oxidation. As another alternative, a comminuted molybdenum metal power or the like having a high melting point may be used in the annulus between the primary electrode and the sleeve member below the eventual subsidence level where oxidation resistance is not necessary. Thus a two-layer annulus fill can be employed.

In accordance with another aspect of the present invention, the primary electrode is hollow and provided with a core which is liquid at operating temperatures. This core comprises a metal such as copper for enhancing the conductivity of the electrode. The primary electrode may then be of smaller diameter and less costly.

According to another embodiment, rather than or in addition to the annulus between the primary electrode and electrode sleeve member being filled with a substantially conductive material, the primary electrode and sleeve member are joined at their lower ends by a conductive joint or plug, e.g. formed of graphite.

In accordance with a further embodiment, electrical connection with the electrodes is established below ground level in order to avoid possible breaking of the electrical circuit by oxidation and disintegration of the electrodes above the melted soil level.

According to yet another embodiment, a plurality of sacrificial electrodes are employed in parallel with main electrodes and protect the main electrodes during start up when electrodes may be subject to greatest deterioration. After a stable melt has been achieved, the main electrodes can then take over.

According to an additional embodiment, auxiliary or outboard electrodes are employed to "square up" the area to be vitrified.

Also according to an embodiment of the present invention, a layer of high temperature insulation is placed over the ground area between electrodes for reducing heat loss. Further, the primary electrode may be coated with a material such as molybdenum disilicide, at least above the level of the aforementioned sleeve, for additional high temperature protection.

It is accordingly an object of the present invention to provide an improved method and apparatus for in situ vitrification of soils.

It is another object of the present invention to provide an improved method and apparatus for in situ vitrification of soils wherein subsidence is promoted without relatively short term failure of soil-contacting electrodes.

It is a further object of the present invention to provide an improved electrode utilized for in situ vitrification processes, characterized by relatively long life.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
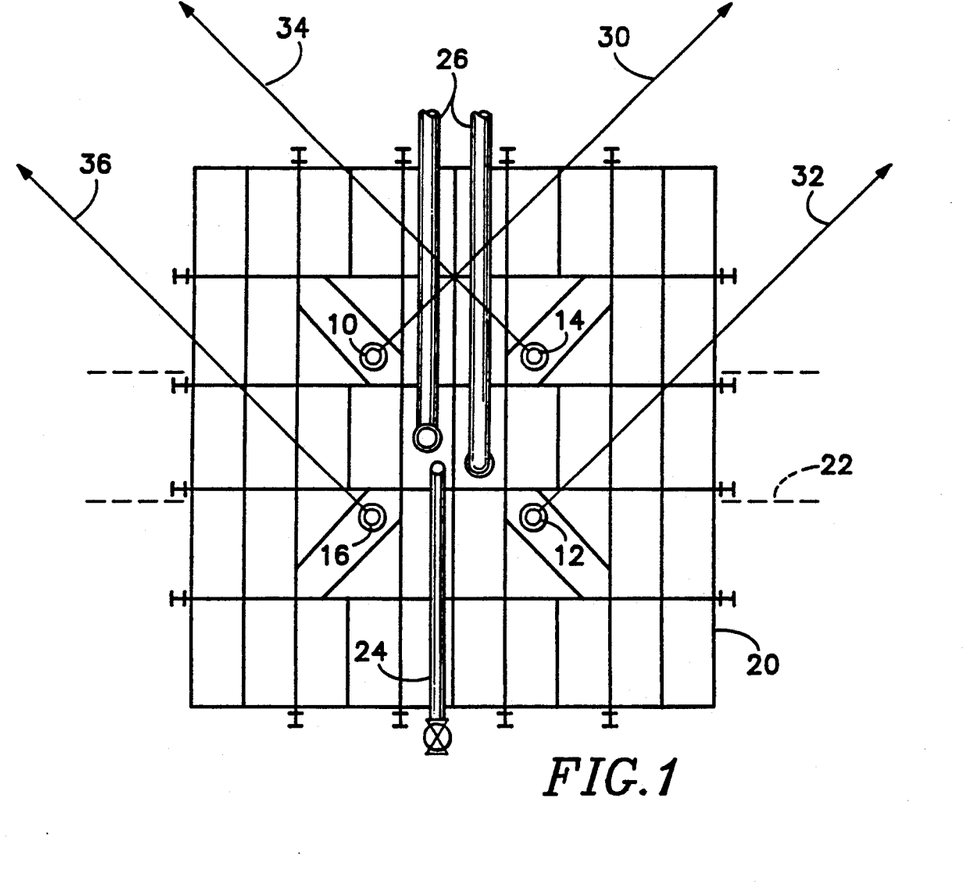
FIG. 1 is a top view of in situ vitrification hood apparatus.
Figure 2:
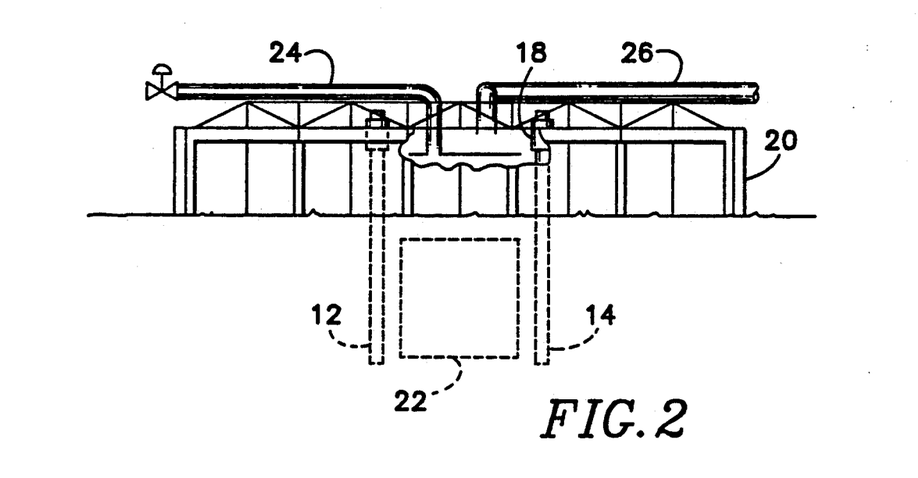
FIG. 2 is a side view of the FIG. 1 apparatus.

Referring to the drawings and particularly to FIGS. 1 and 2 illustrating in situ vitrification apparatus, a plurality of substantially vertically disposed electrodes, 10, 12, 14 and 16 are supported via insulating feedthroughs 18 from the roof of portable hood 20. Hood 20, which is typically about twelve to eighteen meters square by two meters high, is movable with respect to the ground and may be placed over a section of buried trench or the like 22 containing waste materials. The hood is also equipped with a combustion air inlet system 24 and off-gas outlets 26 connected with the top interior of the hood. The off-gas outlets suitably lead to a gas treating or scrubbing system (not shown).

The electrodes 10-16 are either driven into the ground or inserted in casings pre-drilled or impacted into the ground for their reception at locations surrounding or within the underground area containing waste materials. First electrodes 10 and 12 on opposite sides of the trench are connected via conductors 30 and 32 respectively to a first phase of current, while second electrodes 14 and 16, also disposed on opposite sides of the trench, are connected by way of conductors 34 and 36 respectively to a second phase of current. The conductors 30-36 may be joined to the respective electrodes by connector clamps (not shown). Suitably the apparatus is electrically supplied by way of a transportable power substation (also not shown) delivering three-phase power to transformers in a Scott connection for providing two-phase current to conductors 30-32 and 34-36 respectively. Adjustable means may be included for determining the desired voltage and current levels. A load voltage between approximately 4000 and 400 volts is supplied with a corresponding current capacity on each of the two phases of between 450 and 4000 amps. In tests, the final voltage is typically 700 to 600 volts delivering a current between 2000 and 3000 amperes.

Figure 3:
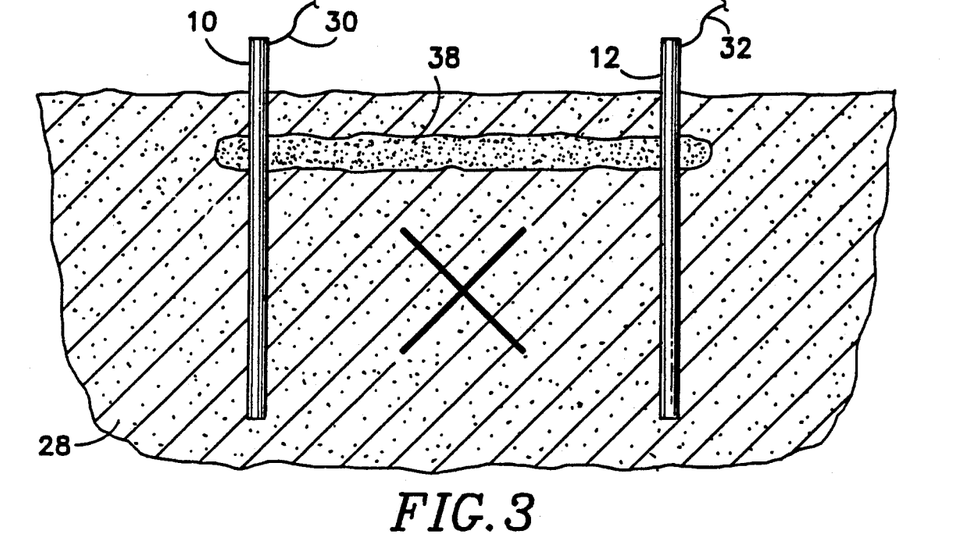
FIG. 3 is a side view illustrating preparation of a soil area for vitrification.
Figure 4:
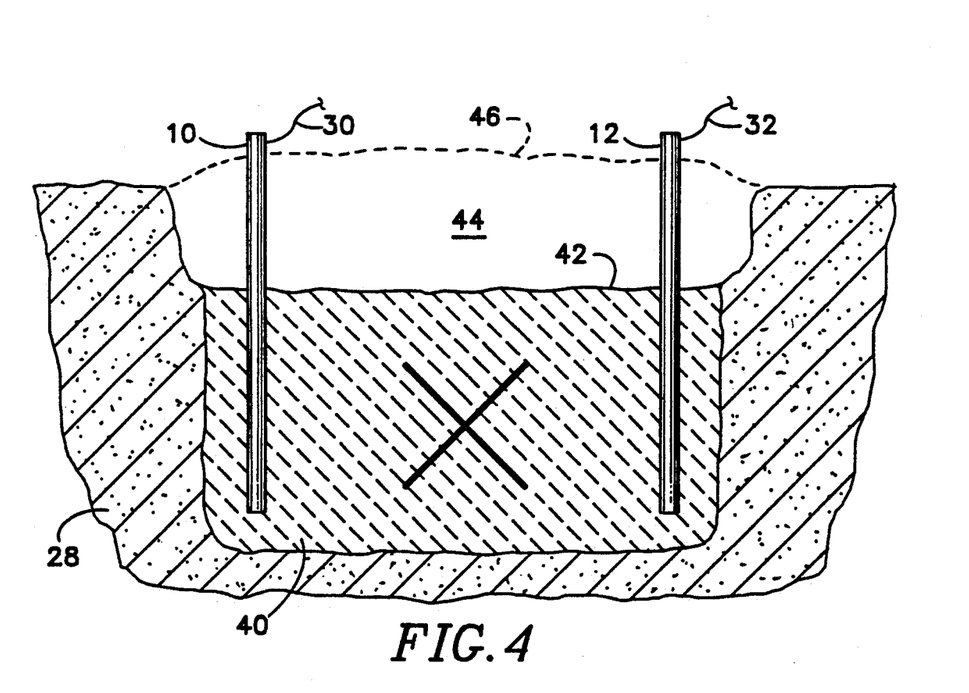
FIG. 4 is a side view illustrating a completed vitrification zone, and alternatively the formation of a cold cap.

The in situ vitrification method is further illustrated schematically in FIGS. 3 and 4. Electrodes 10 and 12 are disposed vertically on either side of or within a region of buried waste material represented by a large X. For starting the soil melting process, a horizontal layer 38 of graphite and glass frit, which may be buried below the surface of the ground and over the waste material, is placed between the two electrodes in contacting relation thereto. A voltage of a few hundred volts is applied between conductors 30 and 32 causing conduction through layer 38 and causing an elevation in the temperature for melting the glass frit component and the portion of the soil 28 immediately therearound. A current carrying liquid glass pool 40 is established which progressively enlarges both laterally and vertically downwardly, engulfing the waste materials as illustrated in FIG. 4. The waste materials will be melted, pyrolized or dissolved in the molten soil mass. Metals within the mass may be dissolved or may eventually be found as solid portions at the lower boundary of the glass pool. When the glass pool reaches a desired depth, current flow is discontinued and the pool forms a vitrified mass as a glass, a glass ceramic, or a partially devitrified glass, with crystals and glass dispersed within a solid matrix.

It is often desirable for the surface of the mass to subside as indicated at 42 in FIG. 4 after which it is conveniently backfilled to ensure burial below the ground level. Moreover, the liquification of substantially the entire mass up to level 42 assists in adequate out-gassing to the hood 20 of FIGS. 1 and 2. However, it is sometimes found, instead of subsidence to level 42 as indicated in FIG. 4, a large "cold cap" of porous molten soil in region 44 is formed on the surface of the melt, eventually rising above the original soil surface, i.e., as indicated at 46 in FIG. 4. This phenomenon can create a closure problem that requires excessive backfill in the surrounding area, as well as concern about possible future compaction of the porous vitrified material. Prior graphite electrodes encountered this cold cap problem to a lesser degree than molybdenum electrodes but tended to the short-lived, i.e., they were consumed relatively rapidly by oxidation above the level of the melt at operating temperatures in excess of 600° C. Molybdenum electrodes are found more suitable as far as durability is concerned since a protective layer of molten soil adheres to the molybdenum electrodes protecting them from oxidation and the exposed portion of the molybdenum electrodes may be at a lower temperature. However, the aforementioned cold cap problem is encountered.

Figure 5:
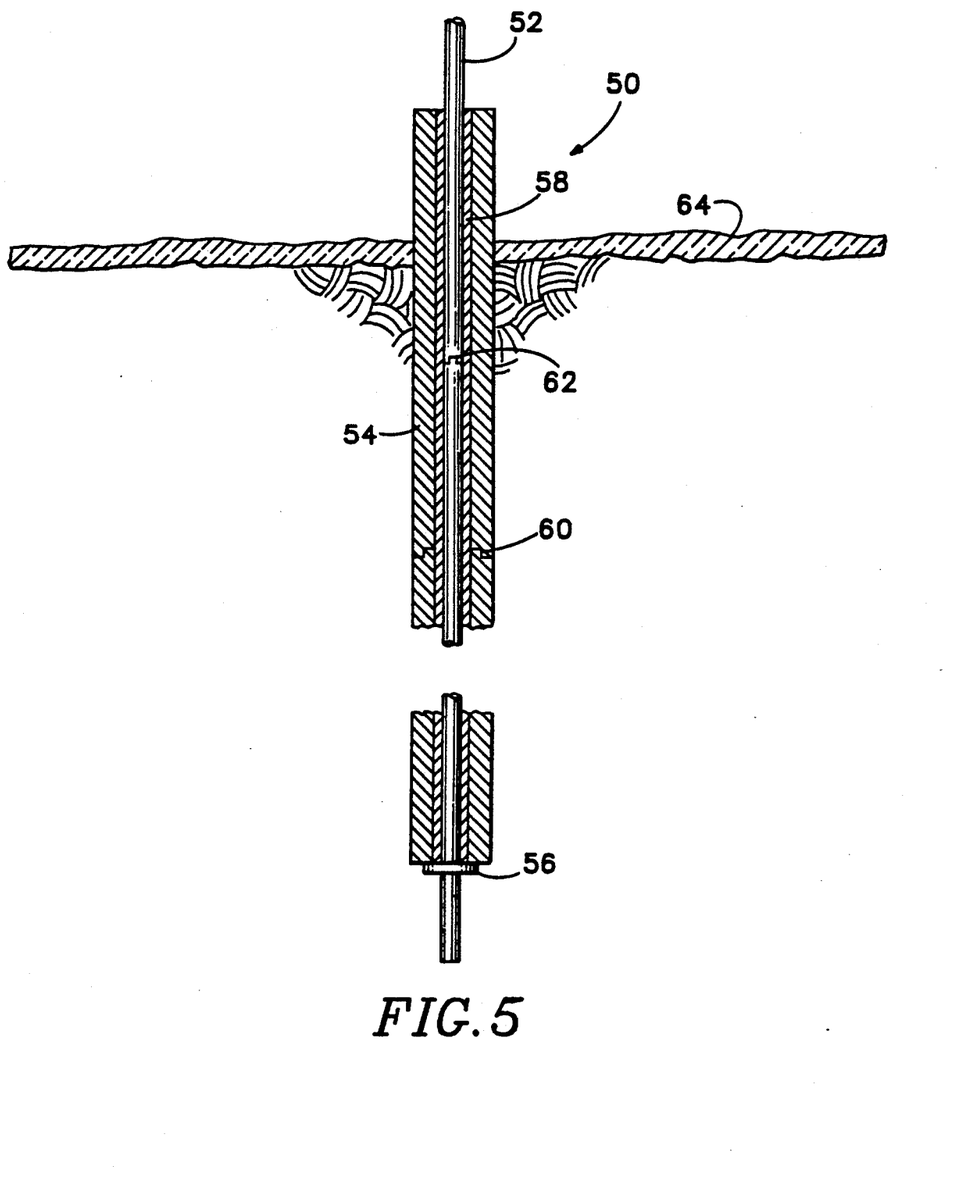
FIG. 5 is a vertical section of an improved electrode in accordance with the present invention.

According to one aspect of the present invention, an improved electrode is provided and is employed in the in situ vitrification process. Such an electrode is illustrated in FIG. 5, with it being understood one or more pairs of such electrodes would normally be employed in spaced relation within the area to be vitrified. Referring now to FIG. 5, showing such electrode in cross-section and partially broken away, a first or principal electrode rod or shaft 52 is positioned substantially vertically in the soil and is surrounded by a second cylindrical electrode sleeve or collar 54 which extends at least over the length of shaft 52 where subsidence is likely to occur, i.e., above the level of mass 42 in FIG. 4 to the original soil level. Shaft 52 is provided with a sacrificial support shoulder 56 toward the lower end thereof by means of which collar 54 (and any annular material) can be positioned and held in place. Although shaft 52 is illustrated as extending below the level of collar 54, both may be terminated at the same level if so desired.

Both shaft 52 and collar 54 are formed of electrically conductive material, while the collar 54 is formed of a material and has a diameter for providing a higher degree of thermal conduction than exhibited by the shaft 52 for promoting subsidence in the soil adjacent the collar 54. In a particular embodiment, shaft 52 comprised a 5.1 centimeter diameter molybdenum rod while collar 54 was formed of graphite having a 6.4 centimeter inside diameter and a 30 centimeter outside diameter. During the in situ vitrification process, the solid graphite collar provides the thermal conductivity desired to keep the surface of the mass (40 in FIG. 4) in molten condition, i.e., heat is conducted to the surface to maintain high surface temperatures and lower glass viscosities thereby promoting subsidence. Also, the graphite has non-wetting characteristics providing a "slip plane" with the molten soil which is of importance in avoidance of the cold cap. During the process, the graphite collar is usually partially or totally consumed above the level of the molten soil surface, but remains intact below the molten soil surface, maintaining the effectiveness of the cold cap subsidence technique. I.e., the collar 54 continues to provide high thermal conductivity, etc. to the top of the melt, inhibiting formation of the cold cap. The thermal conductivity of graphite is five to ten times higher than that of the soil, and although its thermal conductivity is similar to that of molybdenum, it is impractical to consider large diameter molybdenum electrodes to achieve high surface temperatures because of costs. Temperatures within 0.4 meters of the surface are estimated to be greater than 1000° C. for graphite electrode members 1.2 meters in height. This conduction of heat is thought to be a principal factor in cold cap subsidence.

Electrical continuity between the molybdenum shaft 52 and the graphite collar 54 (which have differing expansion characteristics) may be attained by filling the 0.6 centimeter annulus therebetween with a conductor, e.g. a conductive ceramic powder. This powder in one embodiment comprises a mixture of molybdenum disilicide and zirconium diboride ($MoSi_2/ZrB_2$). A preferred formulation for such material comprises a mixture of approximately 88% zirconium diboride and approximately 12% molybdenum disilicide. In addition to maintaining electrical continuity, the material 58 (i.e., ceramic powder) protects the molybdenum shaft 52 from oxidation if the graphite collar 54 is totally consumed above the molten soil surface. The ceramic powder sinters and adheres to the molybdenum surface when exposed to high process temperatures.

Although the above described $MoSi_2/ZrB_2$ mixture is desirable in order to provide electrical continuity and oxidation resistance, other ceramic powdered materials and combinations thereof may be employed, such as, for example $ZrB_2$, $HfB_2$, or $HfB_2/MoSi_2$ mixture.

A further option, e.g. below the subsidence zone or below level 42 in FIG. 4, is to use molybdenum powder as the electrically conductive powder in the annulus. It is possible to use comminuted molybdenum (or similar conductive metal powders) below this level where the electrode sleeve 54 will not be consumed by oxidation. A two-layer annulus fill can be employed, with ceramic powder above level 42 and metallic powder such as molybdenum powder below level 42.

It is also desirable to coat the molybdenum shaft 52, at least above the level of collar 54, with flame-sprayed or fused coating materials such as $MoSi_2$, $ZrB_2/MoSi_2$, $HfB_2/MoSi_2$, $ZrB_2$ or $HfB_2$ to protect the shaft from high temperatures. The preferred oxidation resistant coating material consists of $MoSi_2$. This coating is applied and fused in a furnace at 1400° C. However, the resulting electrode should not be exposed to temperatures greater than 1750° C. and, since the $MoSi_2$ coating is somewhat brittle, care must be taken in handling the electrodes thus coated. A further alternative comprises coating the surface area of the molybdenum shaft with a protective metal, e.g. flame-sprayed stainless steel. A glass coating or a glass cylindrical sleeve is another alternative.

According to an additional feature of the present invention, the technique is augmented by surface insulation. A layer approximately ten centimeters thick of high temperature insulation material such as alumina/silica fiber assists in suppressing the cold cap formation. This layer of insulation is placed over the ground area between the electrodes as indicated at 64 in FIG. 5. The insulation reduces heat losses from the surface, keeping it molten. Maintaining an at least partially molten surface aids in the release of gasses generated by the process and subsidence as hereinbefore described.

A further construction in the avoidance of oxidation, particularly of molybdenum shaft 52, involves a larger diameter graphite collar 54. In the above example, the outside diameter of collar 54 was described as 30 centimeters. The utilization of a graphite collar larger than this aids in prevention of oxidation failure of the molybdenum shaft 52, but it is, of course, more expensive. The larger diameter collar tends to provide sufficient material to maintain a protective sheath in the subsidence zone while avoiding the problem of cold cap formation.

Collar sections can be screwed together by means of a threaded collar joint 60 in FIG. 5 to provide support for the molybdenum shaft and protect the same from transverse loads during subsidence. The molybdenum rod may also be provided with threaded joints as at 62. Further sections of rod and collar can be joined together and fed into the soil surface while maintaining the protective graphite collar arrangement.

Although particular materials have been disclosed above, the present invention in a broader sense is not restricted to particular materials. Thus, the electrode shaft 52 in the FIG. 5 embodiment instead of comprising molybdenum may instead comprise a metal ceramic combination such as molybdenum disilicide or zirconium diboride.

Figure 6:
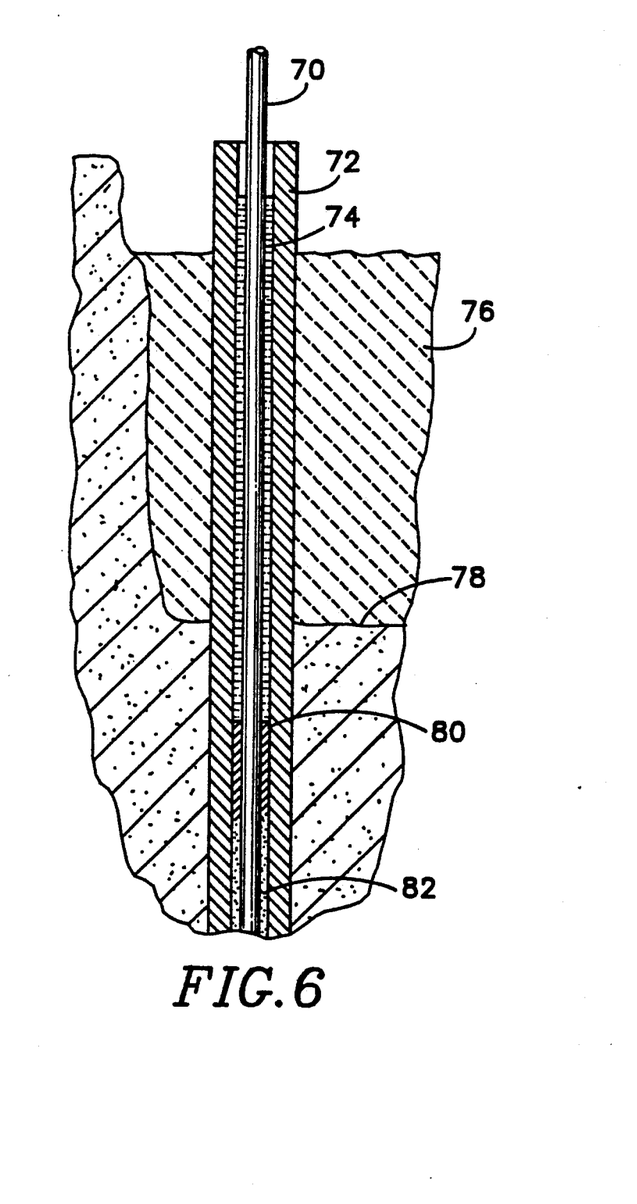
FIG. 6 is a vertical section, partially broken away, of an improved electrode in accordance with a preferred embodiment of the present invention.

A preferred embodiment of an electrode in accordance with the present invention is illustrated in FIG. 6. A first or principal electrode rod or shaft 70 is again positioned substantially vertically in the soil and is surrounded by a second cylindrical sleeve or collar 72 which extends at least over the length of shaft 70 where subsidence is likely to occur. As in the previous embodiment, shaft 70 is preferably formed of molybdenum while collar 72 is preferably formed of graphite such that during the in situ vitrification process, the graphite collar provides the thermal conductivity desired to keep the surface of the mass in a molten condition.

In this embodiment, electrical continuity between the molybdenum shaft 70 and a graphite collar 72 is attained by providing an intervening layer 74 of a conductive metal such as copper, suitably in the form of a powder. Copper melts at 1083° C. (1981° F.) and is therefore molten in the region of the electrode that is in the molten soil, and even slightly below the melt line until it is cooled by heat transfer to the surrounding soil. Even though the copper melts, it provides a very good connection between the shaft and collar and is contained therebetween. When copper powder is disposed in between the shaft 70 and the collar 72 during the initial preparation of the electrode, the same can be held in place by a shoulder 56 (as illustrated in FIG. 5). During the soil melting procedure, the copper fill in the annulus becomes molten proximate to levels where the current is conducted to the soil and the temperature is raised to the soil melting point. However, the copper is molten only approximately down to region 80 in FIG. 6 where the molten copper is cooled and forms a solid copper plug in the annulus, supporting the molten copper thereabove. The copper plug will form within about 12 inches below the progressing melt interface at 78. The copper plug is dynamic in nature, such that as the melt 76 progresses downwardly, so does the copper plug interface. This moving plug and the ever increasing molten copper region will continue downwardly until the in situ vitrification process has been carried out to the desired depth. The material 82, below the copper plug, may be partially comminuted copper material, but will tend to become solid as molten copper flows toward and partially through it.

Although copper in comminuted form has been hereinabove described, it will be appreciated that a solid copper sleeve may be employed in the annulus 74, with an additional external connection provided between shaft 70 and collar 72 if the copper sleeve is not solidly joined between the shaft and the collar. Such additional connection may be initially located at the upper extremities of the members 70 and 72, or proximate lower portions thereof as illustrated with respect to the embodiment in FIG. 8, hereinafter described. Furthermore, although copper is preferred, other relatively low melting point conductive metals can be substituted therefor, in either comminuted or solid form, e.g. aluminum or silver. Ferrous metals or alloys are excluded because of their interaction with the graphite or molybdenum. Copper is advantageously selected because of its high electrical conductivity, low cost as compared with conductive ceramic powders, and the absence of chemical interaction with either molybdenum or graphite.

Figure 7:
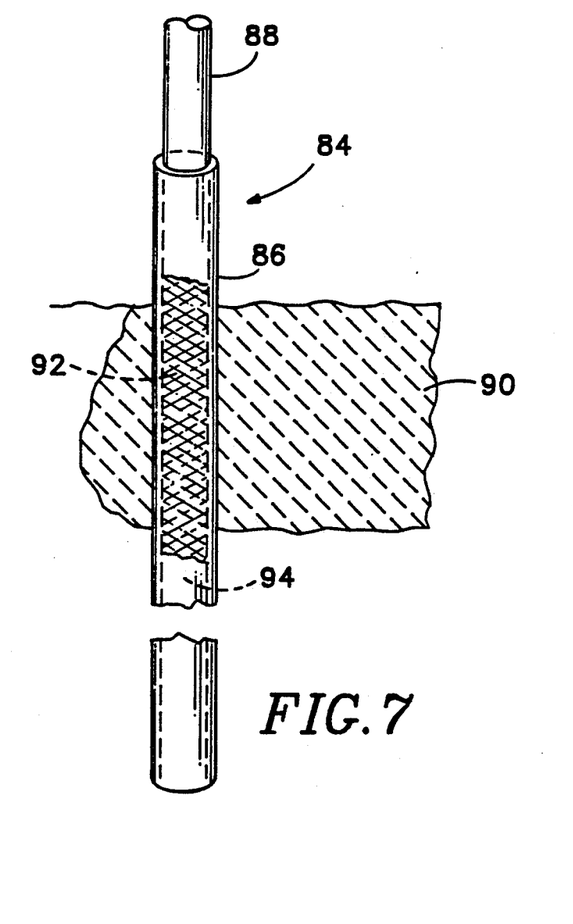
FIG. 7 is a side view, partially broken away, of an improved electrode in accordance with an another embodiment of the present invention.

Referring to FIG. 7, illustrating a further embodiment of the present invention, an electrode 84 for use in the in situ vitrification process suitably comprises a molybdenum tube or hollow cylinder 86 provided with a core 88 initially comprising a solid copper rod. During the soil melting process, current is conducted to tube 86 for application to the soil forming a molten pool 90. At levels within the electrode where current is delivered to the soil rendering the latter molten, the copper rod melts at 92, but remains solid above the soil surface and below the melt line at 94. Although comminuted copper may be employed within tube 86 in place of the rod, the use of a solid rod 88 is preferred because of the greater volume reduction which takes place as the copper powder melts. If the molybdenum tube 86 and the copper rod 88 are not initially in contiguous relation, copper powder can be employed in the annulus between tube 86 and rod 88, or an initial external connection may be provided between tube and rod above the soil surface, or therebelow in the manner of the embodiment of FIG. 8 as hereinafter described.

Although the electrode 84 of FIG. 7 can be utilized as illustrated, i.e., in direct contact with the melted soil, it is preferred the entire electrode 84 take the place of a molybdenum shaft as depicted for example at 52 in FIG. 5 or 70 in FIG. 6, surrounded with a graphite collar. In such case the molybdenum tube then makes electrical connection with the surrounding graphite collar by one of the connection methods herein described, for example through a comminuted conductive material in the annulus between the molybdenum member and the graphite collar.

The advantage of employing a hollow molybdenum member 86 in the FIG. 7 embodiment relates to the saving compared to the cost of a solid molybdenum electrode. The copper material, which becomes molten at high operating temperatures, exhibits an electrical resistance almost on the order of $\frac{1}{4}$ that of molybdenum. Consequently, the volume of molybdenum required is reduced without any sacrifice in current carrying capacity of the electrode. The molybdenum tubular electrode can even be made smaller in diameter than a solid electrode because of the increased conductivity of the interior copper. It will again be realized that although copper is preferred because of its high conductivity and comparatively low cost, other materials such as aluminum or silver may be substituted for the copper.

Figure 8:
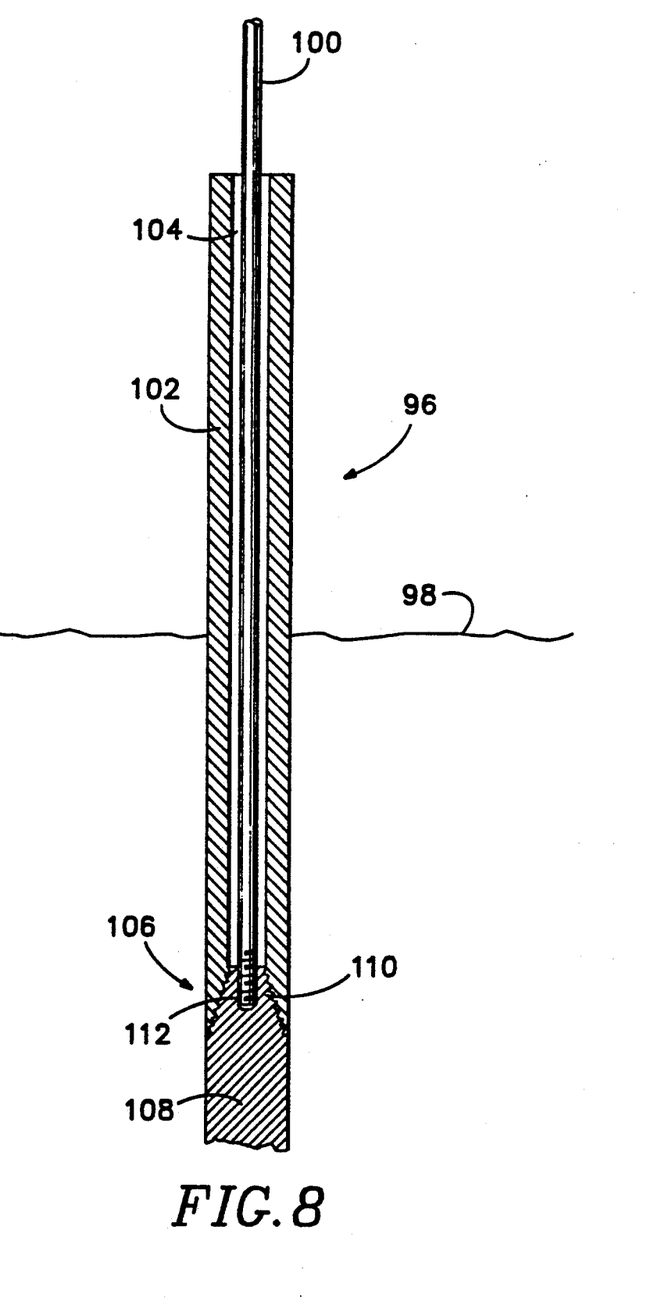
FIG. 8 is a vertical section of yet another electrode embodiment in accordance with the present invention.

An additional embodiment of the present invention is illustrated in FIG. 8 wherein electrode 96, shown as extending below soil level 98, comprises a molybdenum shaft 100 received within a graphite collar 102. Both elements 100 and 102 are adapted to extend well below the soil line and preferably below the subsidence level of the melted soil. In this embodiment, the annulus 104 may merely comprise an arbitrary fit or spacing between the two coaxial members, or may be filled with a conducting material if sufficient gap exists. If a fill is desired, a glass frit material is preferred. In the illustrated embodiment, the joining of members 102 and 104 at a level 106 below the subsidence level is accomplished employing a graphite plug 108 tapped at its tapered upward end 110 to receive threaded end 112 of shaft 100. Plug 108 is desirably of the same diameter as graphite collar 102, the latter being countertapered to receive the upper end 110 of the plug 108. Moreover, the tapered upper end of the plug and the countertapered lower portion of collar 102 are threaded to provide a male-female, tapered threaded joint at 106 for securely fastening the two members together.

Thus a substantial electrical connection is provided between shaft 100 and collar 102, whereby no other electrical connection need be made except from the power source to shaft 100. The graphite collar 102 may deteriorate down to the melt line 98, i.e., down to the subsidence level without affecting circuit continuity.

It will be seen that a substantial portion of the overall electrode 96 can be formed of a cheaper graphite material since shaft 100 need only extend down as far as the expected subsidence level with the plug 108 extending therebelow. Thus a cost reduction is achieved because only a relatively short length of molybdenum rod is required.

It is desirable to plate the threaded end of the molybdenum rod with copper or the like before the same is threaded into the graphite plug in order to prevent embrittlement by diffusion of carbon into the molybdenum. Alternatively a thin copper film or foil can be employed therebetween. It will be noted that in this embodiment, since the graphite collar is firmly fixed in place, enhanced protection is provided to the molybdenum shaft.

Figure 9:
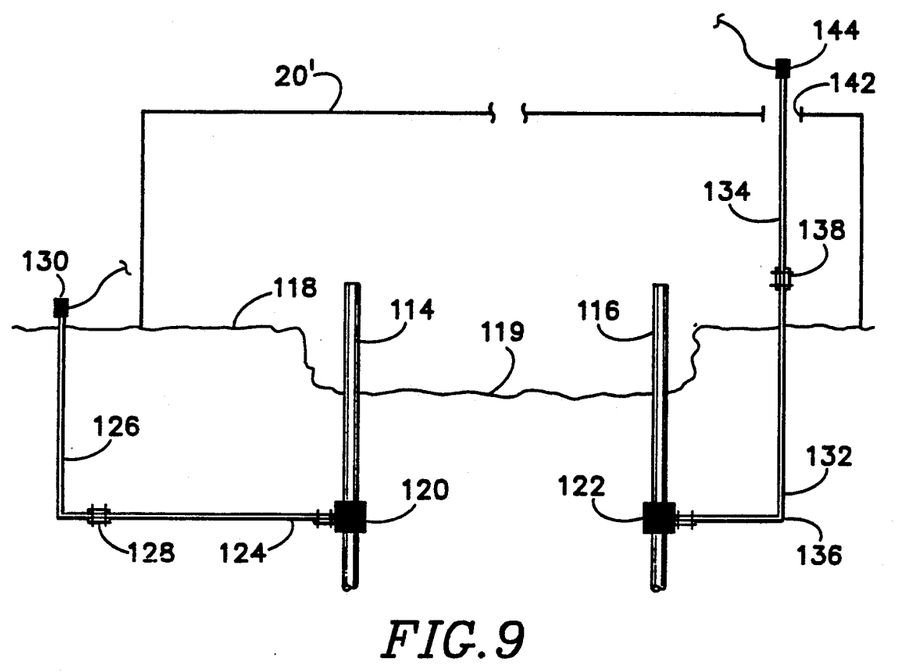
FIG. 9 is a side view of an electrode system according to the present invention including below ground connection.

In accordance with a yet further embodiment as illustrated in FIG. 9, means are provided for making electrical connection to soil melting electrodes 114 and 116 below the soil surface 118, and below the subsidence level 119. In this manner, the possibility of breaking the electrical circuit by oxidation and disintegration of the electrodes above the soil level is avoided. The electrodes 114 and 116 in this embodiment are suitably molybdenum or graphite rods and have electrical connectors or clamps 120 and 122 attached thereto approximately six feet below initial ground level and preferably below the region where the soil is to be melted.

In FIG. 9, alternative types of power connections are shown, one associated with each electrode. In each case the connection comprises a molybdenum flat bus bar extending directly away from the region between the two electrodes. Thus, a first flat bus bar 124, attached to electrode 114 by way of molybdenum connector or clamp 120, follows a pathway diametrically opposite to the direction of electrode 116 from electrode 114, and in any case farther from electrode 116 than the inter-electrode spacing between electrodes 116 and 114 in order to prevent substantial conduction from the bus bar to the surrounding soil. For economic reasons bus bar 124 is connected to a second bus bar 126, suitably formed of aluminum, at riveted connection 128 located at a distance from the electrode 114 where the aluminum will not be substantially affected by melt zone temperatures. Aluminum bus bar 126 extends to the surface and to a connector 130 for attaching to a cable or the like delivering current to the electrode from a power source.

Flat molybdenum bus bar 132 extends from the molybdenum connector or clamp 122 attached to electrode 116, and diametrically away from electrode 114, but in this case is attached to an aluminum bus bar 134 above the soil surface. The aluminum bus bar extends vertically upwardly over an approximately 90° bend at 136 in the molybdenum bus bar, at a point removed from electrode 116 but still within the area covered by off-gas hood 20'. In this case, molybdenum bus bar 132 is joined to aluminum bus bar 134 at riveted joint 138, after which the aluminum bus bar extends through an opening in the hood represented at 142 for coupling to a connector 144 where a power cable may be attached.

In the instance of the FIG. 9 embodiment, the deterioration of the electrodes by oxidation above the level of the melt is thus not significant because the electrical connection is maintained below ground level. In the case of the FIG. 9 embodiment, as in the other embodiments described, the soil melt is initiated near the ground surface by placing a layer of graphite and glass frit or the like between the electrodes in the manner illustrated at 38 in FIG. 3. The melt then proceeds downwardly from the initially melted area of the glass frit. However, the melting may be substantially accomplished before coming near connectors 120 and 122.

Figure 10:
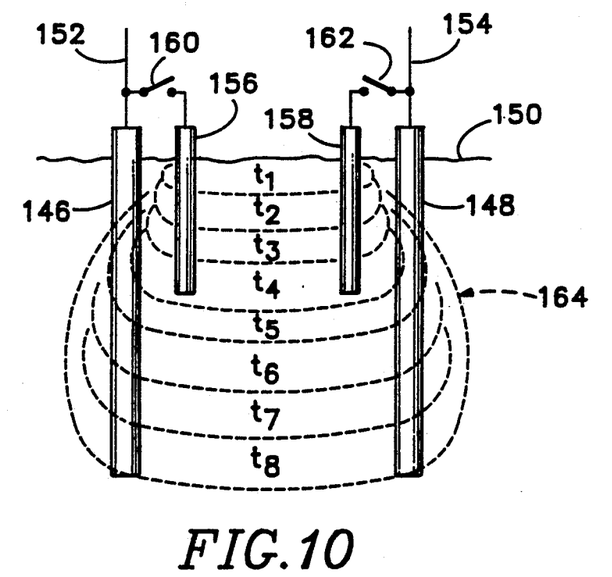
FIG. 10 is a side view of another electrode system in accordance with the present invention employing sacrificial, start-up electrodes.

Referring to FIG. 10, illustrating a further electrode system in accordance with the present invention, electrodes 146 and 148, which may take the form of any of the electrodes hereinbefore described, are extended below ground level 150 at spaced locations for the purpose of bringing about melting and ultimate vitrification of the soil therebetween. Electrical connections 152 and 154 lead from electrodes 146 and 148, respectively, to a source of power (not shown). In accordance with this embodiment, additional "sacrificial" electrodes 156 and 158, which are suitably shorter than the aforementioned electrodes 146, 148, are positioned "in front of" electrodes 146, 148, i.e., electrode 156 is positioned between electrodes 146 and 148 but closer to electrode 146, while electrode 158 is disposed between electrodes 146, 148 but closer to electrode 148. The electrodes 156 and 158 can be formed of any of the aforementioned materials but each need only comprise a rod of graphite or the like inasmuch as it is intended these electrodes be employed only for initiating the soil melting process. Electrodes 156 and 158 may also be smaller in diameter than electrodes 146, 148. Electrode 156 is coupled to connection 152 by way of switching means 160, while electrode 158 is similarly coupled to connection 154 via switching means 162. The configuration of FIG. 10 is desirably part of a larger array as illustrated in plan view in FIG. 11, i.e., comprising not only electrode pairs 146, 156 and 148, 158, but also electrode pairs 166, 176 and 168, 178 arranged in a line disposed in bisecting perpendicular relation with the first mentioned electrodes to provide a quadrilateral array.

Returning to FIG. 10, assume switches 160 and 162 are closed and that a substantial source of power is thus applied between electrodes 156 and 158. Moreover, assume an initial layer of graphite and glass frit has been provided between electrodes 156 and 158 as indicated at 170 in FIG. 11. As the melting of the soil between electrodes 156 and 158 proceeds, the perimeters 164 indicate the profile of the soil melt at successive times $t_1, t_2, \ldots t_8$. As can be seen in FIG. 10, at time $t_4$ the soil melt zone has grown outwardly and contacts electrodes 146 and 148 (as well as electrodes 166 and 168 in the case of the complete array). At this time, or at a time thereafter such as $t_5$, $t_6$ or $t_7$, switching means 160 and 162 may be opened whereby the regular electrodes carry the total current.

Although electrodes 156 and 158 may be substantially damaged due to oxidation and other chemical action during start up, the main electrodes now come into play and are less subject to the initial destructive forces present at the beginning of the procedure. During the first stage of conduction through the layer 170 of graphite and glass frit, high current densities take place relative to the electrodes and localized high start up temperatures are experienced which promote rapid electrode deterioration. Since the sacrificial electrodes 156 and 158 are employed during this period and take the brunt of the destructive forces, the principal electrodes 146, 148 are retained in better condition and are better able to survive the complete soil melting process. Moreover, with electrodes 156 and 158 more closely spaced, a comparatively lower voltage may be applied therebetween to provide the same voltage gradient in the ground. If only the first two principal electrodes were to be used, the voltage would in any case have to be lowered as the soil becomes more conductive to keep the expenditure of power within reason and within the capability of the power supply as the current increases. Since the configuration of FIG. 10 permits the use of a lower voltage to begin with, a power supply having a smaller range of voltage adjustment can be used and the power supply can be employed more efficiently.

Figure 11:
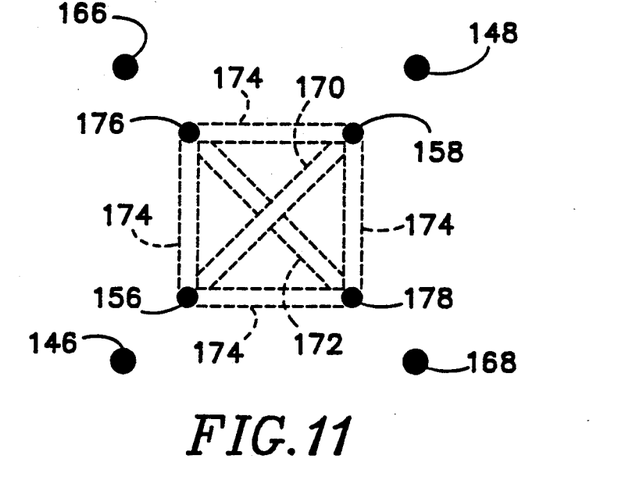
FIG. 11 is a plan view of the FIG. 10 system.

In the case of the array of FIG. 11, it will be appreciated that power is switched from electrodes 176, 178 to electrodes 166, 168 (by means not shown) at substantially the same time power is switched from electrodes 156, 158 to electrodes 146, 148. Moreover, a horizontal layer 172 of a graphite and glass frit is initially disposed between electrodes 176 and 178, as well as along paths 174 between adjacent starting electrodes if desired. A two-phase source of power can be utilized for the FIG. 11 configuration in the manner described in connection with the apparatus of FIGS. 1 and 2.

Figure 12:
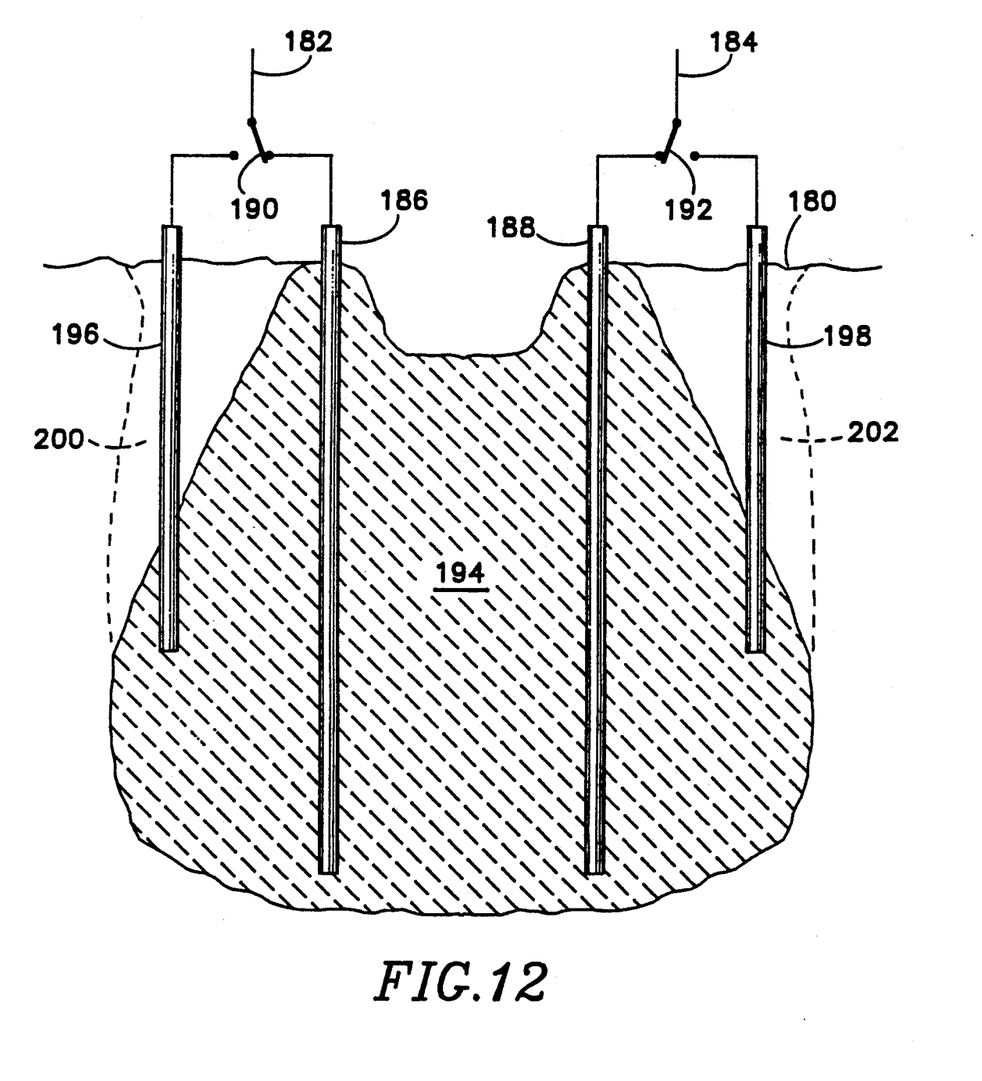
FIG. 12 is a side view of a further electrode system in accordance with the present invention.

Referring to FIG. 12, depicting a further embodiment of an electrode system according to the present invention, electrodes 186 and 188, which may be of a type corresponding to any of the electrodes described herein, are driven or otherwise extended into the soil 180 in spaced relation from one another. Current is supplied from conductors 182 and 184 by way of switching means 190 and 192 respectively to the electrodes 186 and 188, and an initial conductive path is provided so as to cause melting of the soil in region 194 therebetween. One of the characteristics of the melting process is the formation of a soil melt which can be narrower at the top and wider below ground. In accordance with the embodiment in FIG. 12, a pair of outboard electrodes 196 and 198 which may be shorter than electrodes 196 and 198, are disposed outside the region defined between electrodes 186, 188. Thus, outboard electrode 196 is farther from principal electrode 188 than is principal electrode 186, and outboard electrode 198 is farther from electrode 186 than is electrode 188.

After initial melting of the soil to provide the somewhat balloon shape melt profile, switching means 190 and 192 can be operated (with the power to conductors 182 and 184 temporarily interrupted) to connect the source of current to the shorter electrodes 196 and 198, the lower ends of which extend into the melt. Operation with the latter shorter electrodes for a period of time tends to "square up" the melt, melting the soil in the regions 200 and 202. It will be noted that electrode 196 should be disposed in sufficient proximity to electrode 186 so that it will extend into the melt at its lower end, while electrode 198 is similarly disposed with respect to electrode 188.

As an alternative to switching power from electrodes 186, 188 to electrodes 196, 198, another switching method places electrodes 186, 196 in parallel with electrodes 188, 198 whereby power is applied between the principal electrode and outboard electrode of the respective electrode pairs.

The embodiment of FIG. 12 is suitably expanded to a quadrilateral configuration of the type illustrated in FIG. 11, with it being understood the principal electrodes are in such case disposed at the locations in FIG. 11 of the previous sacrificial electrodes, while the outboard electrodes are at the outside corners. The "squaring up" of the melted region, and therefore subsequently of the vitrified region, permits a better match of the vitrified zone shape to actual waste site shape, particularly in the instance of the quadrilateral configuration. This procedure also permits more complete vitrification from top to bottom when adjacent in situ vitrification melts are performed.

It will again be appreciated that the invention is not restricted to particular materials, and although such electrode materials as molybdenum for the inner electrode shaft and graphite for the outer electrode collar are preferred for the reasons hereinbefore set forth, in a broader sense other conductive materials can be substituted therefor.

While several embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

We claim:

1. A method for in situ vitrification of soil, comprising:
    forming an electrode by inserting an electrically conductive shaft within an electrically conductive collar formed of a material and having a diameter for providing a higher degree of thermal conduction than said shaft,
    positioning said electrode in the soil at a location spaced from a second electrode such that a lower portion of the first mentioned electrode is embedded in the soil while an upper portion extends above the soil level,
    passing an electric current between said electrodes and through the soil therebetween for raising the temperature of the soil and melting said soil at levels along and between said electrodes including conducting heat to the top level of melted soil via said collar in an enhanced manner by virtue of its higher thermal conduction as compared with that of the shaft alone to inhibit formation of cold cap material, and
    discontinuing the flow of current to permit cooling and solidification of said soil between said electrodes.

2. The method according to claim 1 including forming said shift of molybdenum and forming said collar of graphite.

3. The method according to claim 2 further including disposing a comminuted conductive material between said shaft and said collar.

4. The method according to claim 3 wherein said comminuted material comprises a ceramic.

5. The method according to claim 4 wherein said comminuted material is selected from the group consisting of $ZrB_2$, $HfB_2$, a mixture of $MoSi_2$ and $ZrB_2$, and a mixture of $MoSi_2$ and $HfB_2$.

6. The method according to claim 4 wherein said material comprises a mixture including a major proportion of $ZrB_2$ and a minor proportion of $MoSi_2$.

7. The method according to claim 6 wherein the proportion of $ZrB_2$ is approximately 88% and the proportion of $MoSi_2$ is approximately 12%.

8. The method according to claim 4 further including coating said shaft with a material selected from the group consisting of $MoSi_2$, $ZrB_2$, $HfB_2$, a mixture of $MoSi_2$ and $ZrB_2$, a mixture of $MoSi_2$ and $HfB_2$, stainless steel, and glass.

9. The method according to claim 3 wherein said comminuted material comprises a metal.

10. The method according to claim 9 wherein said metal comprises molybdenum.

11. The method according to claim 9 wherein said metal has a melting point rendering the same molten at operating temperatures of said method proximate levels where current is conducted to said soil and melts said soil.

12. The method according to claim 11 wherein said metal is copper.

13. The method according to claim 11 wherein said metal is initially comminuted, melts proximate levels where the soil is melted, and forms a solid plug below levels where said soil is melted during carrying out of said method.

14. The method according to claim 1 wherein the interior of said electrically conductive shaft is formed of a metal having a melting point rendering the same molten at operating temperatures of said method proximate levels where current is conducted to said soil and melts said soil.

15. The method according to claim 1 including connecting said conductive shaft with said conductive collar substantially below the soil surface.

16. The method according to claim 15 including disposing comminuted glass between said shaft and said collar above the level of connection of said conductive shaft and said conductive collar.

17. The method according to claim 1 further including placing a layer of insulation substantially immediately upon the surface of the soil between said electrodes.

18. A method for in situ vitrification of soil, comprisingd forming an electrode with a metal exterior portion having a first melting point and a metal interior portion having a second and substantially lower melting point, positioning said electrode in the soil at a location spaced from a second electrode, passing an electric current between said electrodes and through the soil at levels along and between said electrodes while melting said interior portion of said electrode, and discontinuing the flow of current to permit cooling and solidification of said soil between said electrodes.

19. The method according to claim 18 including forming said metal interior portion of copper.

20. The method according to claim 18 wherein said metal interior portion is initially comminuted.

21. A method for in situ vitrification of soil, comprising:

inserting at least one pair of electrodes into the soil at spaced positions from one another, connecting terminals of a source of electrical current to said electrodes proximate first locations on said electrodes which are disposed substantially below the surface of the soil, passing electrical current between said electrodes substantially below the surface of the soil via said connections for the purpose of conducting said current to the soil and melting said soil including soil between said electrodes above said first locations, while preserving said connections, and discontinuing the flow of current to permit cooling and solidification of the soil between said electrodes.

22. The method according to claim 21 including providing an initial electrically conductive path in the soil between said electrodes substantially above said first locations to initiate melting of the soil thereabove.

23. The method according to claim 22 including passing said electrical current to said electrodes via pathways each farther in the soil from the remaining electrode of the pair than the spacing between electrodes.

24. A method for in situ vitrification of soil, comprising:

inserting at least a pair of electrodes comprising a first electrode and a second electrode means into the soil at spaced positions, inserting at least a third electrode in the soil substantially between said first electrode and said second electrode means, initially passing electrical current to the soil between said third electrode and said second electrode means for melting the soil therebetween as well as around said third electrode while at least partially consuming said third electrode, and switching said electrical current from said third electrode to said first electrode.

25. The method according to claim 24 wherein the said third electrode is placed in sufficient proximity to the first electrode so that the soil substantially adjacent said first electrode is melted before current is switched thereto.

26. The method according to claim 25 wherein said second electrode means comprises a second electrode and a fourth electrode and wherein said fourth electrode is inserted into the soil between said second electrode and said third electrode, said method further comprising:

switching electrical current from said fourth electrode to said second electrode, wherein said fourth electrode is placed in sufficient proximity to the second electrode so that soil substantially adjacent said second electrode is melted before current is switched thereto, said fourth electrode being at least partially consumed before the current is switched to said second electrode.

27. A method for in situ vitrification of soil, comprising:

inserting at least a pair of electrodes comprising a first electrode and a second electrode into the soil at spaced positions, inserting at least one outboard electrode in the soil farther from said second electrode than the spacing between the first electrode and said second electrode, initially passing electrical current to the soil between said first electrode and said second electrode for melting the soil therebetween, and switching electrical current to said outboard electrode for extending the region of melted soil.

28. The method according to claim 27 wherein said outboard electrode is inserted into the ground to a lesser depth than said first electrode and in sufficiently close proximity to said first electrode to contact soil melted adjacent said first electrode prior to said switching of electrical current.

29. The method according to claim 27 further including inserting third and fourth electrodes into the ground completing a quadrilateral array with said first and second electrodes, inserting additional outboard electrodes outwardly of said array behind said second, third and fourth electrodes, and switching electrical current to said additional outboard electrodes for squaring up a region of melted soil.

* * * * *

UNITED STATES PATENT AND TRADEMARK OFFICE
CERTIFICATE OF CORRECTION

PATENT NO. : 5,100,259
DATED : March 31, 1992
INVENTOR(S) : James L. Buelt, et al.

It is certified that error appears in the above-identified patent and that said Letters Patent is hereby corrected as shown below:

Column 2, line 46, "power" should read --powder--.

Column 5, line 8, "tended to the short-lived" should read --tended to be short-lived--.

Column 12, line 64, "said shift of" should read --said shaft of--.

Column 13, line 53, "comprisingd" should read --comprising:--.

Signed and Sealed this

Twenty-first Day of December, 1993

*Attest:*

BRUCE LEHMAN

*Attesting Officer*   Commissioner of Patents and Trademarks